Figure 8:
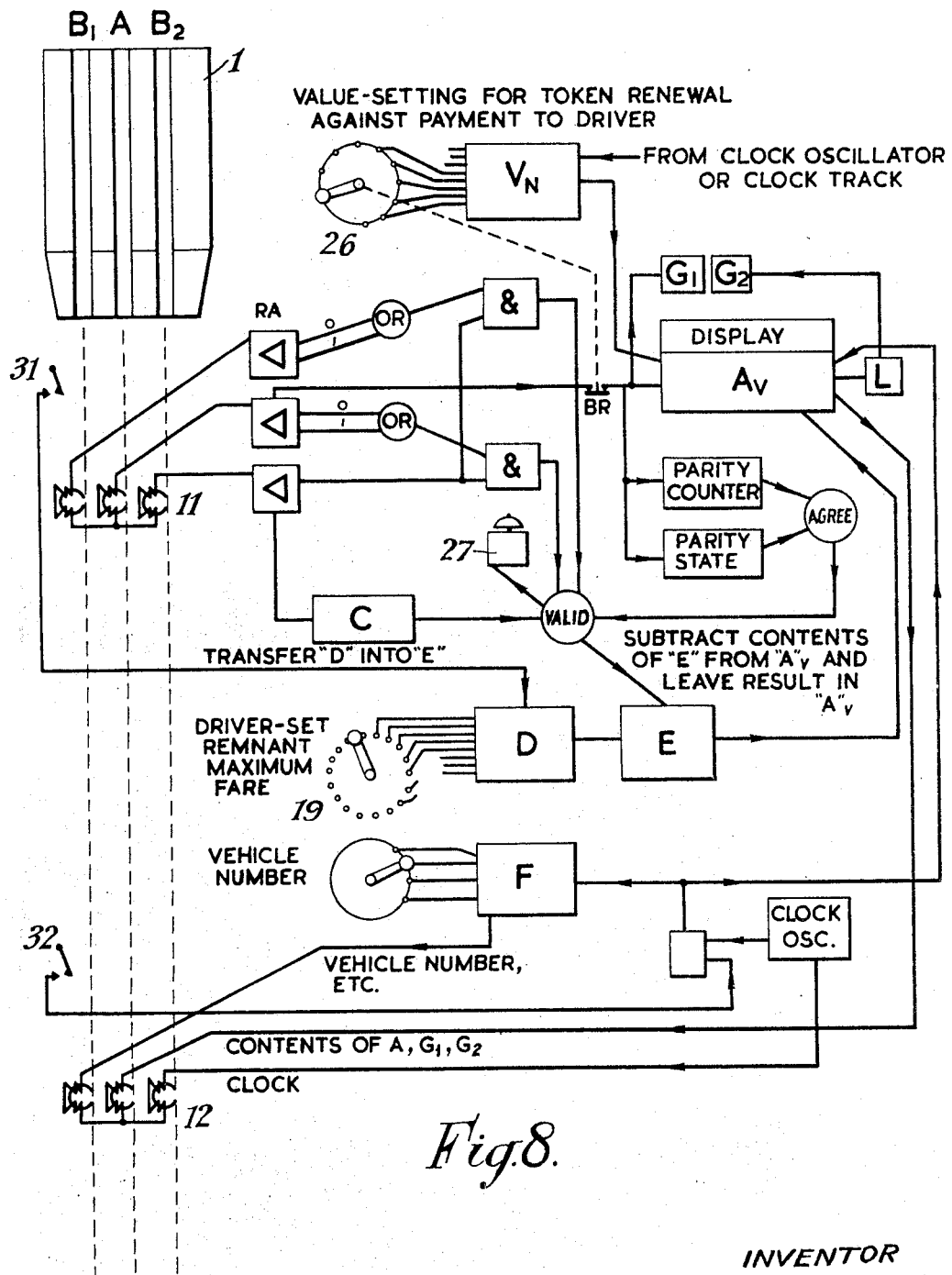

Nov. 22, 1966　　　J. W. HALPERN　　　3,287,543
TICKET SYSTEMS
Filed June 24, 1963　　　　　3 Sheets-Sheet 1
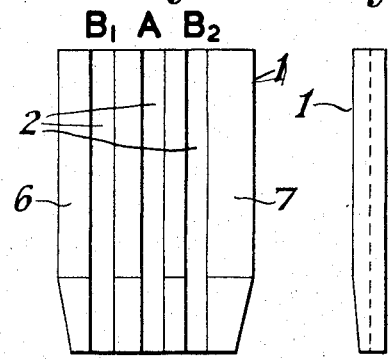
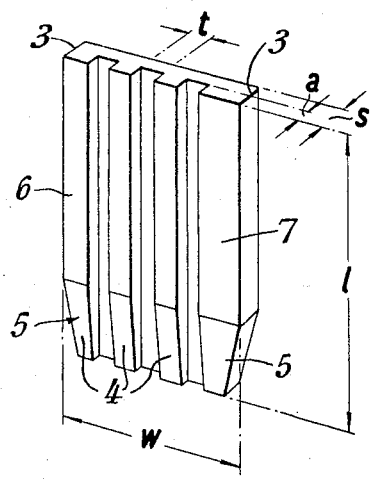
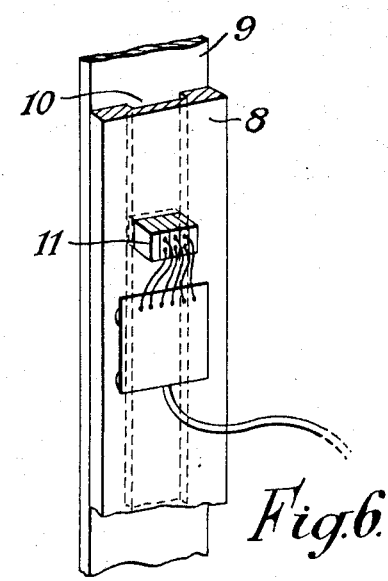
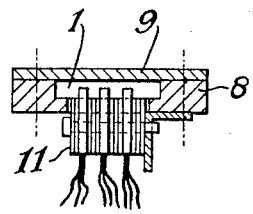
INVENTOR
JOHN W. HALPERN
BY Imirie & Smiley
ATTORNEYS

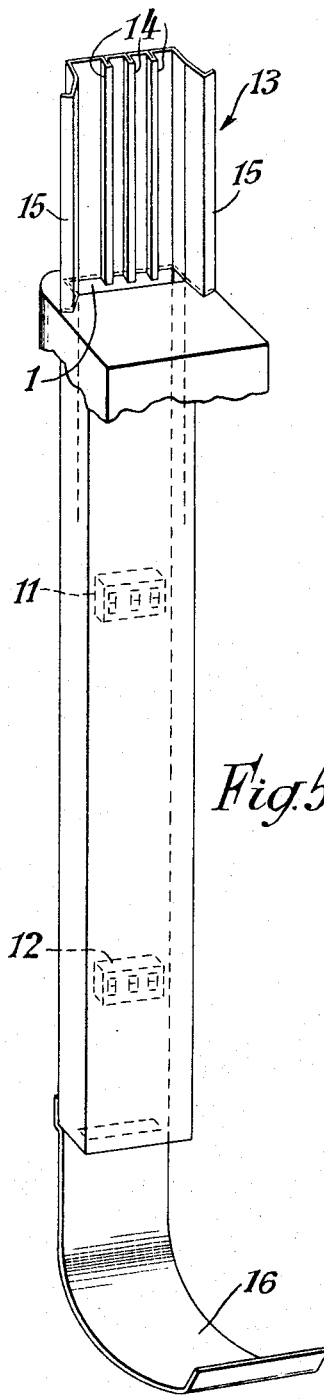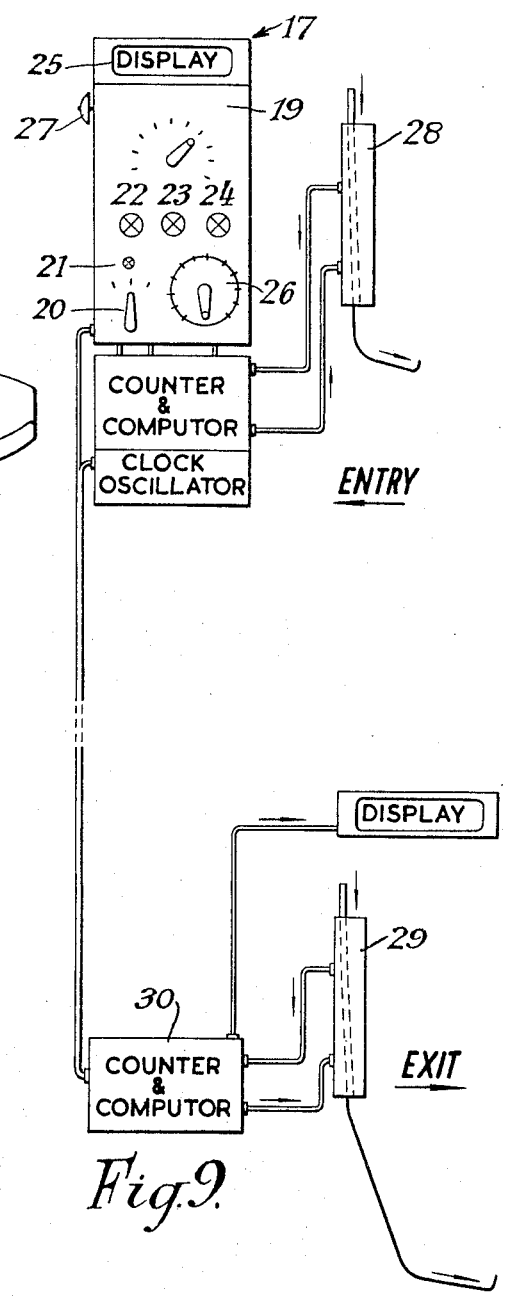

United States Patent Office 3,287,543
Patented Nov. 22, 1966

3,287,543
TICKET SYSTEMS
John Wolfgang Halpern, 31 Airedale Road,
London, England
Filed June 24, 1963, Ser. No. 290,051
Claims priority, application Great Britain, Apr. 20, 1956,
12,146/56; July 4, 1956, 20,695/56; Jan. 2, 1957,
129/57
4 Claims. (Cl. 235—61.12)

This is a continuous-in-part of application Ser. No. 659,196, filed Apr. 16, 1957.

The present invention relates to improvements in ticket systems and more particularly to tickets for use therein.

Although the invention is particularly useful in its application to passenger transport vehicles, and will in fact be later described with reference thereto, it can also be adapted for other uses such as in coin operated telephone systems, railroad travel or air travel.

Generally a ticket is a receipt for a certain fee paid and it has printed on it such data as will determine or circumscribe the limit of the service to which the ticket entitles.

The underlying idea of the invention is to replace the use or exclusive use of visible information on the ticket, i.e. printed or punched numerals, holes, etc., by pulses recorded on a magnetic coating on the ticket, such pulses being capable of being arranged to enable, among other things, successive devaluation of the ticket to take place with successive uses thereof.

One use of the ticket of the invention could be in a ticket system for passenger transport vehicles in which each ticket has a magnetic coating for recording thereon information significant of a monetary value of the ticket, and in which there is provided first ticket checking means operative at a point of passenger entry of a vehicle for recording on said magnetic coating information significant of the point of entry, and a second ticket checking means, operative at a passenger's destination for comparing said first-mentioned information with information, produced by said second checking means, significant of the point of passenger exit from the vehicle, and recording on said magnetic coating and/or indicating a monetary value equal to said first-mentioned monetary value minus the fare for the passenger's journey.

It is the primary object of the invention to provide a ticket of such a size and form that it can be handled and used like a coin while at the same time not have its efficiency of operation impaired in any way by such handling.

It is a further object of the invention to provide a ticket registration device of simple construction into which the ticket is inserted for signals to be recorded thereon or for signals already thereon to be read.

It is also an object of the invention to provide a ticket that can only be inserted into the registration device in the correct manner.

Other and further objects will be explained hereinafter and will be more particularly pointed out in the appended claims.

The invention will now be described in detail, but by way of example only, with reference to the accompanying drawings in which:

FIGURE 1 is a front elevation of the ticket,
FIGURE 2 is a side elevation of the ticket,
FIGURE 3 is an end elevation of the ticket,
FIGURE 4 is a perspective view of the ticket,
FIGURE 5 is a perspective front view of a registration machine,
FIGURE 6 is a fragmentary rear view of the registration machine,
FIGURE 7 is a cross-sectional view showing how the magnetic heads of the registration machine enter into the tracks of the ticket,
FIGURE 8 is a circuit for the entry registration machine, and
FIGURE 9 shows the layout of the entry and exit registration machines in a bus.

*General description of a fare system for passenger vehicles in which the ticket of the invention can be used*

Differential fares would be payable for different distances travelled and a route would be divided into a number of preferably equidistant fare stages or zones. A passenger would buy a ticket having a magnetic coating thereon with a signal recorded thereon to show that it is valid for a definite interzonal distance, on any route. When entering a bus, tram, train, or alternatively when passing through a first station to enter same at a given first fare stage, the passenger would insert the ticket into a registration machine, which would record on it a signal characteristic of that first fare stage and return the ticket to the passenger. On completing his journey the passenger would insert the ticket into a similar registration machine, at the exit of the bus, tram, train or alternatively at the second station. A third signal would be applied to the ticket characteristic of this second fare stage, the effect of which would be to subtract from the value of the ticket, as represented by the first signal, the value that has been expended in travelling between the two fare stages. The ticket would then be returned to the passenger.

The registration machines would also detect whether the cost of the journey just travelled was greater than the remaining value of the ticket. If this were the case the passenger would then have to pay to have the ticket restored to a value sufficient to meet the cost of the journey.

In the case of the entry registration machine being on a passenger vehicle, the said first signal would be altered as the vehicle passed from one fare zone to another in order that said signal shall be characteristic of the particular zone in which the vehicle is at the time. In the case of the vehicle being a bus the driver could advance a zone setting switch as the bus passes from one zone to another.

The above is a brief description of the system, given in order that an appreciation can be obtained of the parts the particular ticket and registration machine of the invention play in it.

*Ticket—Figures 1 to 4*

As the primary object of the invention is to provide a ticket of a more or less permanent utility enabling its owner to use it many times as he would a coin, the following requirements must be satisfied:

(i) The ticket must be formed in such a manner that it offers the maximum resistance to damage by bending, creasing or tearing.

(ii) The ticket must be immune to deterioration in normal atmospheric conditions.

(iii) The ticket must have good dimensional stability so that it is not likely to choke the registration machines when passed therethrough.

(iv) The magnetic coating on which the information is recorded must not be liable to be worn off by the continual handling of the ticket.

(v) The ticket must be dimensioned to render it small enough to be easily and conveniently carried, large enough to be easily handled and of a shape and size that will allow it to pass through the registration machines without difficulty.

A preferred form of the ticket is shown in FIGURES 1 to 4. The ticket is made of a hard non-corrosive aluminium alloy although it could alternatively be made of a zinc or copper alloy or a suitable hard wearing plastics material. Whatever the material chosen it should satisfy the criterion of being hard wearing and non-corrosive.

The ticket 1 is in the form of a plate having a thickness $s$ of about 0.2 inch, a length $l$ of about 2 inches and a width $w$ of about 1.25 inches.

There are three recessed information tracks $B_1$, A and $B_2$ which extend for the whole length of the ticket. The depth $a$ of each track is at least equal to $0.5\ s$ and the width $t$ is not greater than $1.5\ a$. This dimensioning of the tracks is essential in order to ensure that the magnetic coatings 2 that are on the bottoms thereof will not get rubbed away by the continual handling to which the ticket will be subjected. This consideration in designing the ticket would not arise in the case of known types of record members having magnetic coatings on which information is to be recorded since such record members are designed to replace an office record of the more conventional type such as a client's bank balance sheet, statistical data record, or the like. Such known record members are intended to be properly handled as part of the appropriate office job or the like and are not normally subjected to the sort of handling to which a coin would be subjected.

Consequently the factors to be taken into account in designing the ticket of the present invention are totally different from those taken into account in designing the aforementioned known record members. Although it has been proposed to put discrete recesses, as opposed to a continuous track, on such a known record member this has been done in order to facilitate the depositing of a magnetic ink in a particular location on the record member and the depth of the recesses used would not be sufficient to prevent the magnetic coating from being rubbed off as a result of the kind of continual handling of the record member that the present invention envisages.

The two upper corners 3 of the ticket are rather sharp-edged to prevent the ticket from being easily inserted by this end into the registration machine. In contrast the other end of the ticket is generally tapered at surfaces 4 and 5 to facilitate its insertion by this end into the registration machine.

The width $t$ of the three tracks $B_1$, A and $B_2$ can be equal but they are as a whole positioned asymmetrically across the width of the ticket so that the bordering portions 6 and 7 are of different widths. This is done so that the ticket can only be inserted into the registration machine in one way. The registration machine which is designed in conjunction with the ticket will now be described.

*Registration machine—Figures 5 to 7*

The registration machine comprises a tube made up of a channel sectioned portion 8 and a plate 9 thereby forming a passage 10 of rectangular cross-section which is just big enough to allow a ticket 1, as aforedescribed with reference to FIGURES 1 to 4, to fall therethrough under the action of gravity, without there being enough clearance to permit transverse or lateral oscillation of the ticket as it drops.

Two sets of magnetic heads 11 and 12 protrude into the passage 10. The three heads of the set 11 are reading heads and the three heads of the set 12 are recording heads. These magnetic heads are designed so that their yokes protrude into the passage 10 by an amount very nearly equal to the depth $a$ of the tracks $B_1$, A and $B_2$. The top of the tube is provided with a guide 13 of metal plate having rails 14 positioned so that when a ticket is placed correctly onto the guide 13 they do not contact the sides or bottoms of the tracks $B_1$, A and $B_2$. If on the other hand it is attempted to insert the ticket upside down the fact that the tracks as a whole are asymmetrically positioned, as stated earlier, will result in the rails not coinciding with the tracks thereby preventing insertion of the ticket.

The tapered surfaces 4 and 5 of the ticket facilitate its correct insertion into the guide 13 which has splayed flanges 15 to further facilitate the correct placing of the ticket in the guide.

The ticket falls under gravity past the two sets of magnetic heads 11 and 12 in a fraction of a second and can then be collected by the passenger from a discharge chute 16.

*General layout of system in a bus—FIGURE 9*

A control panel 17 is mounted beside the driver's seat 18.

A zone setting switch 19 is provided which must be advanced by the driver wherever the bus crosses from one fare zone to the next, in order to alter the first said signal which must be characteristic of the particular zone in which the bus is in fact travelling.

The control panel 17 is also preferably provided with a switch 20 which sets the maximum permissible number of passengers to alternatively a low, a medium, or a high figure, depending on the circumstances of the journey. A lamp 21 lights up when the maximum permissible number of passengers in the vehicle is reached or alternatively exceeded by one.

Lamps 22, 23 and 24 will light up if the value of a ticket inserted in the entry registration machine is respectively, not adequate, exactly adequate or amply adequate for the maximum possible journey that could be travelled from that particular fare zone, notwithstanding the fact that the passenger may not wish to travel this maximum distance. A system of reducing the value of the ticket by the amount of the journey travelled by first deducting the value of the fare that would be required to travel to the terminus of the bus route, will be described later.

The exact value of the required fare can be read off a digital display unit 25. In the event of the lamp 22 lighting up the driver will request the passenger to renew the value of the ticket to a level sufficient to pay the required fare. This can be done by the passenger giving the driver a round sum of money, say 50 cents or 1 dollar, or several of these units. The driver will then set a third switch 26 to the appropriate monetary value and the passenger will then re-insert his ticket into the entry registration unit. The ticket on passing from the registration unit will have a value equal to the renewal value plus any surplus value that was already present and minus the fare to the terminus. This process can be executed very quickly since there would be no changing of money involved.

The ticket could also have a special signal recorded on it to distinguish it from forgeries so that in the event of a forged ticket being inserted into the entry registration machine the absence of the genuity signal will be detected and an alarm bell 27 set off.

The ticket could also possibly be provided with the passengers name and a code number.

Assuming that the ticket is genuine, valid and of sufficient value, then the following is one form of operation that is effected by the registration machines.

The ticket is inserted in the entry registration machine 28 and the value as read off track A is reduced by the fare payable to reach the terminus from the point of entry. At the same time particulars of the vehicle, the route, and possibly the date or time of entry are recorded on the track $B_2$. When the passenger wishes to leave the vehicle the ticket is inserted into the registration machine 29 and the contents on track $B_2$ are noted and compared with those permissible for the current journey. The value of track A is noted and to it is added the fare value from the point of exit to the terminus, and this value is re-recorded onto the track A. This final value of A is the same as that obtained by simply deducting the cost of the journey from the original value of A at the entry zone. However, using the steps described above to reach this value enables the circuitry for effecting devaluation of the ticket to be simplified. This method of first subtracting the fare that would be payable to reach the terminus may not always be applicable in practice and alternative methods could then be employed.

At the same time as the above described process is being applied to track A, the signals on track $B_2$, which were put on in one form by the entry registration machine, are inserted into another form, such as clock pulses, provided that the comparator sections of the computor 30 indicate that the ticket is satisfactory. If the ticket is not satisfactory the original form of the signal on track $B_2$ is left unaltered which means that the ticket will not be accepted as genuine by the next entry registration machine into which it is inserted.

The same conditions apply if the passenger alights from a bus or from a station without exit-registering his ticket. Then, too, he will have to pay a penalty fee when re-entering a bus or a station since the ticket will not be valid. This system provides a strong motivation for each passenger to exit register even though no barriers at all are foreseen at the exit doors. This will make for speedy exit procedures and cheaper equipment avoiding the usually quite cumbersome turnstiles and the like.

At all stages in this data handling process adequate checks of the information are made to ensure that no errors are made and that no fraudulent actions can occur.

With the aid of FIGURE 8, the main parts of the entry registration unit 13 shall be described here.

*Detailed description of the manner in which the logical sequence of operations is effected—FIGURE 8*

The ticket 1 is dropped, or alternatively pneumatically propelled, past a triple magnetic head unit 11. The head which reads the contents of the clock track $B_2$ provides a signal which is used as one input to two separate AND gates, the other inputs from the value track "A" and the genuity track $B_1$. These gates give an output only if there is either a 1 or an 0 on the A and $B_1$ tracks, and synchronous with the output from the clock track. The token is only accepted as valid if:

(a) To each clock pulse $B_2$ there is either a 1 or an 0 on A.
(b) To each clock pulse $B_2$ there is either a 1 or an 0 on $B_1$.

If valid, the information of the A track is transferred into unit $A_v$ and the contents may be observed by means of the display panel 25 attached thereto. As the information comes in the from the heads, the number of the $1_s$ and/or $0_s$ is counted by a counter B, and the state of this is compared with the contents of the last stage of unit $A_v$. This is the usual parity check in a conventional computor. The third test of validity is thus that the parity counter agrees with parity state.

Whilst this is proceeding the number of clock pulses from track $B_2$ is counted by unit C and the fourth condition of validity is that pulses present on the $B_2$ track should not be greater in number than the number of information states. If these four checks are satisfied, an instruction is issued from the "VALID" unit to substract the contents in unit E from the contents of $A_v$. If they are not satisfied an alarm bell 27 placed next to the driver's seat 18, begins to sound.

The numerical contents of E is dependent on the setting of the switch 19 by means of which the driver sets the state of a shift register D. The value thus set is different for different zones of the route, and it is here proposed to correspond to that fare which would be chargeable from the route zone concerned to the terminal station of the route, or to some intermediate main station. As the journey proceeds, the switch 19 is advanced. Every time a ticket is inserted into the unit 28 (FIGURE 9) a switch 31 is closed which causes the register D to transfer its contents to unit E, the effect being that immediately on the store $A_v$ being charged with a valid ticket, value information the contents of E is being deducted from it so that $A_v$ will now contain the initial value of the ticket minus the value of the maximum possible journey. As the ticket moves in the unit it passes the second triple head 12. A switch 32 (or the first clock pulse on the clock track $B_2$) causes the output of a vehicle based clock-oscillator to be applied both to the register F and the register $A_v$, counting out their contents into the respective recording heads opposite the tracks $B_1$ and A.

The new contents of $A_v$ is thus transferred into the ticket track A by overwriting the information previously contained thereon. Unit F contains information about a fixed code for the journey in process, as already explained, and this information is emptied into track $B_1$ of the ticket.

When the time comes for the passenger to alight he will insert his token into the exit registration machine which in all respects (mechanically and electronically) is built up nearly identically with the entry registration machine. The chief difference is that the contents of store E in an exit unit is added (instead of subtracted) to the contents of store $A_v$. And furthermore the contents of $B_1$ is compared with the contents of unit F for identity. In case of this identity being satisfied, the record is effaced or filled up with clock pulses thereby validity for a new journey made possible, providing other data is also satisfactory. The meaning of this test is that it proves that the ticket registered for exit is in fact the same ticket as registered at entry. The adding of the contents of E produces in $A_v$ a new value composed of the initial token value at entry minus distance to terminus at entry
plus distance to terminus at exit i.e., it contains the initial value of the token less the fare appropriate to the distance actually travelled.

If a passenger overtravels the value of his token this produces at the exit point the record of a negative value. When therefore the token is renewed at the beginning of a next journey the amount by which the passenger has overtravelled the value of his ticket will be deducted from the paid-for nominal new value of the ticket.

I claim:

1. A fare ticket for an automatic value-fee-or fare counting ticket system, including entry and exit registry machines for reading, recording and computing, comprising a non-magnetic plate of rigid material having at least one continuous rectilinear recessed track formed in one face of the plate and extending orthogonally from one edge of the plate to an opposite edge, said recessed track being provided with a continuous surface of magnetically susceptible matter, adapted to have recorded thereon magnetic impressions of continuous and non-discrete nature during movement of the ticket past a recording head, said recessed track being capable of receiving sensory organs protruding into them for reading and erasing during the passage of the ticket through a registry machine, the surfaces of one end of said ticket being tapered in order to facilitate its insertion into a registry machine.

2. A ticket as claimed in claim 1 wherein said plate is made of a non-corrosive aluminum alloy and having a length of about 2 inches, a width of about 1¼ inches, and a thickness of about .2 of an inch, said ticket having three of said recessed tracks, each having a width not greater than one-and-a-half times the depth thereof, and the depth at least equal to one-half the thickness of the ticket, the recessed tracks as a whole being positioned asymmetrically in said plate, so that the ticket can only be inserted in one way in a registry machine.

3. A ticket as claimed in claim 1, wherein a plurality of said recessed tracks in formed in one face of said plate, parallel to one another, each of said recessed tracks being at least half the thickness of the ticket, said surface of each recessed track formed of magnetically susceptible matter, being the bottom surface furthest from said face of the ticket.

4. A fare ticket according to claim 1 where, the depth of said recessed track is at least one-half the thickness of the ticket.

References Cited by the Examiner
UNITED STATES PATENTS

| | | | |
|---|---|---|---|
| Re. 23,385 | 7/1951 | Knutsen | 235—61.12 |
| 1,135,252 | 3/1915 | Batdorf | 194—4 |
| 2,659,470 | 11/1953 | Du Pont | 194—4 |
| 2,704,187 | 3/1955 | Beach et al. | 235—61.12 |
| 2,783,865 | 3/1957 | Cleave | 194—4 |

MAYNARD R. WILBUR, *Primary Examiner.*

DARYL W. COOK, *Examiner.*